(12) United States Patent
Jarostchuk

(10) Patent No.: US 7,709,077 B1
(45) Date of Patent: May 4, 2010

(54) MULTI-ZONE POP STICK NAPKIN

(76) Inventor: Karen Jarostchuk, 4 MacArthur Rd., Wellesley, MA (US) 02482

( * ) Notice: Subject to any disclaimer, the term of this patent is extended or adjusted under 35 U.S.C. 154(b) by 422 days.

(21) Appl. No.: 11/146,503

(22) Filed: Jun. 7, 2005

(51) Int. Cl.
*B32B 3/24* (2006.01)
*A23G 9/50* (2006.01)

(52) U.S. Cl. .................. 428/131; 426/132; D1/104; D1/105; D1/117

(58) Field of Classification Search .............. 428/131, 428/132; D1/104, 105, 117
See application file for complete search history.

(56) References Cited

U.S. PATENT DOCUMENTS

| | | | |
|---|---|---|---|
| 1,616,570 A | 2/1927 | Boynton | |
| 1,800,759 A | 4/1931 | Shean | |
| D118,840 S * | 2/1940 | Texter et al. | D1/104 |
| 2,321,519 A | 6/1943 | Rubinoff | 229/1.5 |
| 2,628,169 A * | 2/1953 | Berthold, Jr. | 426/104 |
| 2,677,615 A | 5/1954 | Sueskind | 99/137 |
| 2,803,550 A | 8/1957 | Ackalusky | 99/137 |
| 2,948,452 A | 8/1960 | Grogan et al. | 229/1.5 |
| 3,306,512 A | 2/1967 | Pagnini | 229/1.5 |
| 3,351,258 A | 11/1967 | Evantash | 229/1.5 |
| 4,226,355 A | 10/1980 | Helfrich, Jr. | 229/1.5 |
| 4,290,573 A | 9/1981 | Shapiro | 248/152 |
| 4,718,594 A | 1/1988 | Harazi | 229/1.5 |
| 4,720,037 A | 1/1988 | Alpert | 229/1.5 |
| 4,938,411 A | 7/1990 | Rizzuto | 229/1.5 |
| 5,152,454 A | 10/1992 | Warta et al. | 229/1.5 |
| 5,224,646 A | 7/1993 | Biancosino | 229/1.5 |
| D340,343 S | 10/1993 | Rizikow | D1/118 |
| D343,493 S | 1/1994 | Krenkel | D1/105 |
| D379,107 S | 5/1997 | Loch et al. | D1/118 |
| D382,085 S | 8/1997 | Sotile | D1/105 |
| 5,770,250 A | 6/1998 | Smith | 426/134 |
| 6,032,825 A | 3/2000 | Guthrie | 220/731 |
| D426,367 S | 6/2000 | Gale | D1/105 |
| 6,230,764 B1 | 5/2001 | Rodman | 141/86 |
| 6,237,646 B1 | 5/2001 | Rodman | 141/86 |
| D452,761 S | 1/2002 | Swift | D1/105 |
| 6,838,154 B1 | 1/2005 | Varona et al. | |
| 6,852,905 B2 | 2/2005 | Baker | |
| 7,402,157 B2 | 7/2008 | Christon et al. | |
| 2003/0186614 A1 * | 10/2003 | Taylor | 446/26 |
| 2004/0170813 A1 | 9/2004 | Digiacomantonio et al. | |
| 2004/0233241 A1 | 11/2004 | Salacz | |
| 2004/0243080 A1 * | 12/2004 | Baer | 604/378 |

* cited by examiner

*Primary Examiner*—William P Watkins, III
(74) *Attorney, Agent, or Firm*—Foley & Lardner LLP; Steven A. Moore

(57) ABSTRACT

A multi-zone napkin is provided for use with a frozen treat mounted on a stick to absorb drips. A portion of the stick can be located through a mounting slot in the napkin. A distribution zone layer passes liquid through to an absorbent zone layer and may optionally be suitable for printing on a top surface, to display artwork or other messages. The absorbent zone layer retains liquid received from the distribution zone layer. A barrier zone layer can help to retain the liquid in the absorbent zone layer and prevent drips from contacting a user's hand. In addition to absorbing drips, the multi-zone napkin may provide insulation from cold and/or may be configured to provide a soft surface against a user's hand. The napkin may also be designed to inhibit drips from the frozen treat from running off the distribution zone layer.

34 Claims, 3 Drawing Sheets

MULTI-ZONE POP STICK NAPKIN

FIELD OF THE INVENTION

The invention relates generally to devices to absorb liquids and more specifically to devices for use with food mounted on a stick.

BACKGROUND

Frozen treats mounted on sticks, such as flavored ice pops and ice cream treats, are well known and popular treats. These frozen treats tend to melt quickly. Young children are often not able to eat the entire treat before the melting begins. Most often, this results in drips that fall down onto the child's shirt, hand, arm or nearby furniture. Melting frozen treats can become a substantial mess whether consumed indoors or outdoors.

In view of the above, parents typically expect a liquid mess whenever a child is given a frozen treat. Preparation may include a bib for the child or giving a frozen treat only when the child is outside. The bib is only helpful if the drip were to land on the child's shirt. Little protection is offered for the child's hand, arm, lap or the surrounding area. Also, eating frozen treats only outside may be impractical in many situations. A paper towel may be wrapped around the stick, but can be clumsy and sometimes even creates more of a mess.

Parents often assume the frozen treat will make a mess and resign themselves to a clean-up effort after the frozen treat is eaten or dropped. Also, in the case of retail sales of individual frozen treats, such as from an ice cream truck or a store counter, frozen treat vendors often have a line of customers awaiting service. Vendors typically work to minimize the time required to prepare each order and often provide the purchaser with only a dispenser of small napkins which provide some usefulness in wiping up drips, but are of little help in catching drips before they make a mess.

SUMMARY

In view of the problems above, there is a need for a device which could be used to capture drips from a frozen treat with minimal effort on the part of the consumer or frozen treat provider. Such a device could enhance enjoyment of frozen treats mounted on sticks for both parents and children alike.

Aspects of the present invention seek to address the difficulties in the art by providing a multi-zone napkin. A portion of a stick for use with a frozen treat is located through a mounting slot in the napkin. By the use of the mounting slot, the multi-zone napkin may remain in position near the frozen treat to absorb and retain drips from the frozen treat.

In one embodiment, the present invention provides a multi-zone napkin including a distribution zone layer forming a top zone to distribute dripping fluid to an absorbent zone layer below. The absorbent zone layer holds the fluid received from the distribution zone layer. Below the absorbent zone layer is a barrier zone layer 138, serving as a barrier to the fluid in the absorbent zone from passing to the user's hand. The distribution zone layer may be suitable for printing, to display artwork or other messages. Other embodiments of the invention include various systems, devices and methods, as described in further detail herein.

According to one embodiment of the invention, a device is provided for use with a frozen treat. The device includes a distribution zone layer having a top surface and an absorbent zone layer. The absorbent zone layer is located adjacent to the distribution zone layer opposite the top surface of the distribution zone layer and is in fluid communication with the distribution zone layer. A barrier zone layer is located adjacent to the absorbent zone layer opposite the distribution zone layer. A mounting slot is formed in the distribution zone layer, the absorbent zone layer and the barrier zone layer to receive a stick upon which the frozen treat is mounted.

According to another embodiment, a device for use with a frozen treat includes a first layer of hydrophilic, fluid pass-through material having a top surface and a bottom surface. A second layer of absorbent material has a top surface located on the bottom surface of the first layer to receive fluid from the first layer. A third layer of water-resistant material is located on a bottom surface of the second layer. A mounting slot is formed in the first layer, the second layer and the third layer to receive a stick upon which the frozen treat is mounted.

According to another embodiment of the invention, a system for holding a frozen treat includes a distribution zone layer having a top surface and an absorbent zone layer. The absorbent zone layer is located adjacent to the distribution zone layer opposite the top surface of the distribution zone layer and is in fluid communication with the distribution zone layer. A barrier zone layer is located adjacent to the absorbent zone layer opposite the distribution zone layer. A support, such as a stick, is provided upon which the frozen treat can be mounted. The support extends through a mounting slot provided in the distribution zone layer, the absorbent zone layer and the barrier zone layer.

In another embodiment, a system is provided for holding a frozen treat. The system includes a distribution zone layer having a top surface. An absorbent zone layer is located adjacent to the distribution zone layer opposite the top surface of the distribution zone layer and is in fluid communication with the distribution zone layer. A barrier zone layer is located adjacent to the absorbent zone layer opposite the distribution zone layer. A mounting slot is formed in the distribution zone layer, the absorbent zone layer and the barrier zone layer to receive a stick upon which the frozen treat is mounted. A support, upon which the frozen treat can be mounted, extends through the mounting slot.

Another embodiment of the invention provides a means for distributing a fluid to a proximate means for absorbing the fluid below the means for distributing. Below the means for absorbing is a means for providing a barrier to the fluid from passing through the means for absorbing. A mounting slot means is also provided through the means for distributing, the means for absorbing and the means for providing a barrier.

A method of manufacturing a multi-zone napkin for use with a frozen treat is also provided. The method includes the acts of printing an image on a distribution zone layer and adhering an absorbent zone layer to both the distribution zone layer and a barrier zone layer. A continuous mounting slot is also cut in each of the absorbent zone layer, the distribution zone layer and the barrier zone layer.

Another method of manufacturing a multi-zone napkin for use with a frozen treat includes calendering a top surface of a fabric with heat to leave open pores to form a distribution zone layer. A portion of the fabric below the top surface forms an absorbent zone layer. A barrier zone layer is adhered to the absorbent zone layer. A continuous mounting slot is cut in each of the distribution zone layer, the absorbent zone layer, and the barrier zone layer.

A further method of manufacturing a multi-zone napkin for use with a frozen treat is similar to the method above, except that instead of adhering a barrier zone layer, a bottom surface of the fabric is calendered with heat to close substantially all pores to form a barrier zone layer.

Another method according to an embodiment of the invention provides for capturing liquid dripping from a frozen treat. The method includes providing a multi-zone napkin having a distribution zone layer, an adjacent absorbent zone layer in fluid communication with the distribution zone layer, and a barrier zone layer located adjacent to the absorbent zone layer. A support having a frozen treat is located through a mounting slot formed in the distribution zone layer, the absorbent zone layer and the barrier zone layer. A drip from the frozen treat is received in the distribution zone layer. At least a portion of the drip is distributed through the distribution zone layer into the absorbent zone layer.

BRIEF DESCRIPTION OF THE DRAWINGS

The invention will be apparent from the description herein and the accompanying drawings, in which like reference characters refer to the same parts throughout the different views.

DETAILED DESCRIPTION

The present invention provides a multi-zone napkin for use with a frozen treat mounted on a stick. A portion of the stick can be located through a mounting slot in the napkin, allowing the frozen treat to be on a portion of the stick above the napkin and a user's hand holding the stick below the napkin. The napkin can therefore be positioned to catch drips from the frozen treat before they reach the user's hand.

Figure 1:
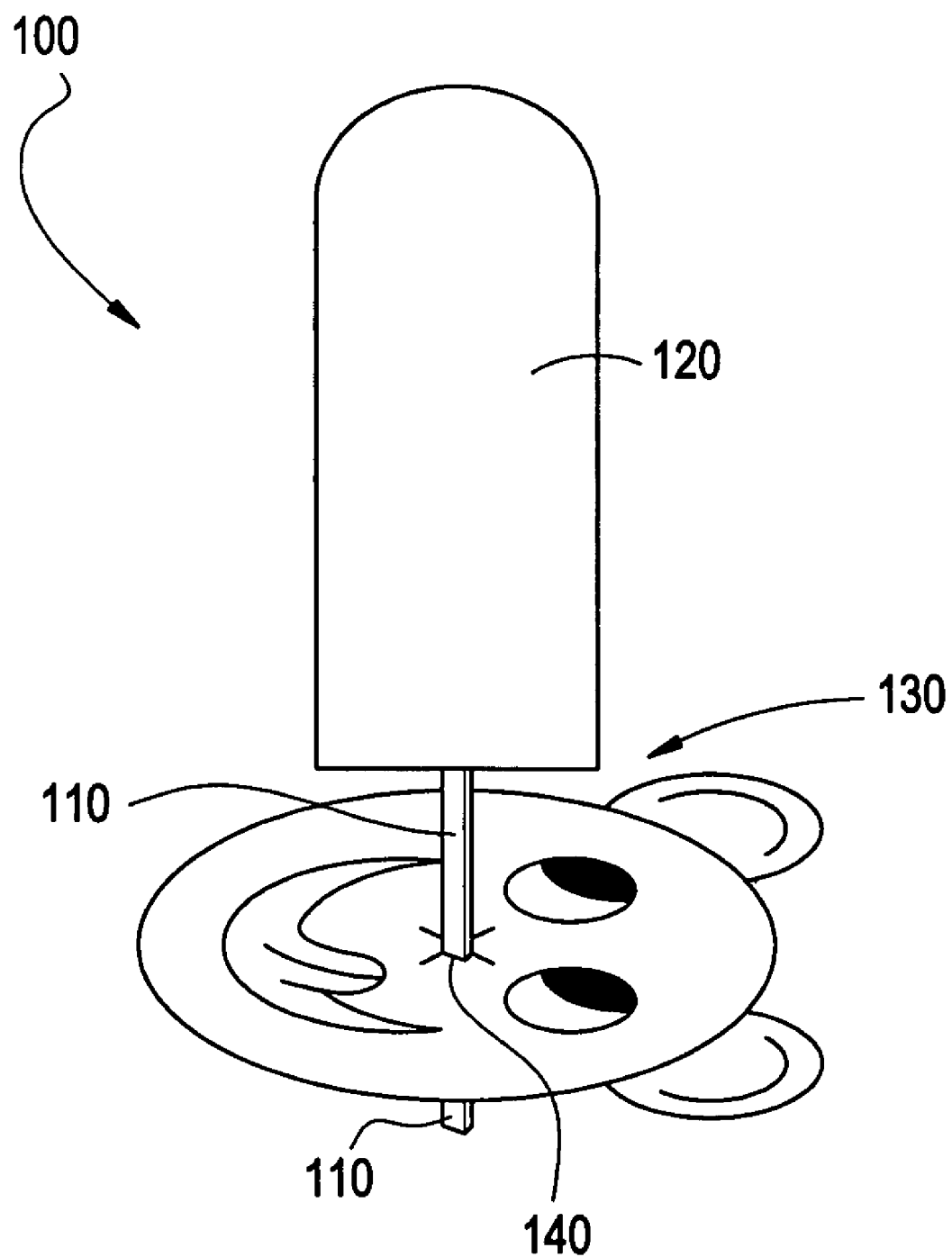
FIG. 1 is an illustration of a system for holding a frozen treat according to an illustrative embodiment of the invention.
Figure 2:
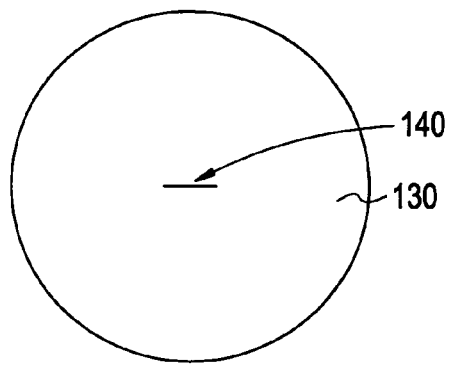
FIG. 2 is a top view of a multi-zone napkin according to an embodiment of the invention.

An illustrative embodiment of the invention is shown in FIG. 1. A system 100 for holding a frozen treat is provided with a support 110 that can be mounted to the frozen treat 120. The support 110 may be a stick, an elongated plastic rod, or other device suitable to be at least partially located within the frozen treat. A multi-zone napkin 130 is provided with a mounting slot 140. The mounting slot 140, also shown in FIG. 2, is sized to accommodate the support 110.

Figure 3:
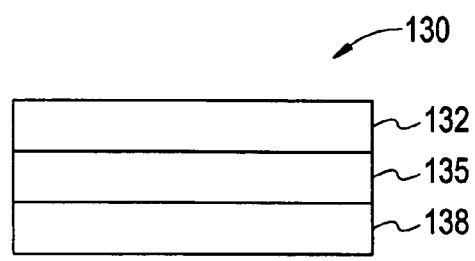
FIG. 3 is a side view of a multi-zone napkin according to an embodiment of the invention.

The multi-zone napkin 130 is formed of at least three zones, as illustrated by way of example in FIG. 3. A distribution zone layer 132 forms a top zone. The distribution zone layer 132 makes initial contact with the fluid dropping from the melting frozen treat and distributes fluid to the zone below, formed by the absorbent zone layer 135. The absorbent zone layer 135 holds the fluid received from the distribution zone layer 132. A third zone, formed by the barrier zone layer 138, is located below the absorbent zone and serves as a barrier to the fluid from passing fully through and out of the absorbent zone layer 135 to the user's hand. The barrier zone layer 138 assists in keeping the fluid within the absorbent zone layer 135 and is at least a water-resistant layer and may be a water-proof layer. The mounting slot 140 is formed though each of the layers of the multi-zone napkin 130 to form a continuous path through the napkin to allow the support 110 to be mounted through the multi-zone napkin 130.

To be in position to catch drips from the frozen treat, the distribution zone layer 132 of the multi-zone napkin 130 is intended to be the zone located closest to the frozen treat 120 when the multi-zone napkin 130 and the frozen treat 120 are both located on the support 110. In distributing fluid to the absorbent zone layer 135 below, the distribution zone layer 132 serves as a fluid pass-through to the absorbent zone layer 135. The distribution zone layer 132 may seek to prevent or minimize beading of liquid on its surface. If the strike through of the fluid is slow, then pooling and run-off of the fluid can occur.

In a preferred embodiment, the distribution zone layer 132 is hydrophilic to quickly distribute fluid contacting a top surface of the distribution zone layer 132 to the absorbent zone layer 135. By way of example, the fibers of the distribution zone layer 132 can be inherently hydrophilic as in wood pulp or, the fibers or fabrics can be chemically treated with a surfactant that imparts hydrophilic properties to fibers and fabrics that are inherently hydrophobic such as, for example, polypropylene. Fiber manipulation treatments can also be performed to modify hydrophilic properties. Chemical or non-chemical treatments can be added or performed to fabrics which are slightly hydrophilic to draw in the fluid, but are not sufficiently hydrophilic to retain most of the fluid and instead will provide for quick distribution of the fluid to the absorbent zone layer. Treatments may be selected to be approved for food contact in view of the proximity of the treatment to a food product, e.g. the frozen treat, and the potential of a child to contact and even accidentally consume the multi-zone napkin 130.

Another aspect of the preferred embodiment of the invention may provide a top surface of the distribution zone layer 132 smooth enough for printing. Although the invention is not so limited, the top surface of the distribution zone layer 132 may be used to provide a smooth surface upon which a print, such as to display artwork or other messages, may be located. A wide variety of printing methods may be used to optionally provide text and/or an image on the distribution zone layer. Examples include, but are not limited to, flexographic printing, foil stamping, digital printing and/or embossing. If printing on the distribution zone layer is desired, the material is selected to allow for the display of the print without excessive distortion of the text or image due to absorbency of ink into the distribution zone layer while maintaining a fluid distribution property to the absorbent zone layer to inhibit run-off of the liquids produced by the melting of the frozen treat 120. Printing may be performed before or after the distribution zone layer 132 is attached to the absorbent zone layer 135.

In the illustrative case of a distribution zone layer 132 formed of a polyester cellulose blend, the polyester may enhance printability and the cellulose may provide absorbency. The relative ratio of polyester and cellulose may be adjusted to provide a surface to precisely locate inks to produce a desired image, while also providing sufficient absorbency. Absorbency may be provided to minimize a likelihood of a drop of liquid from running off of the surface of the distribution zone layer, to allow the drop to be absorbed into and/or through the distribution zone layer to be captured by the multi-zone napkin 130.

Also in a preferred embodiment, the distribution zone layer 132 may be lint free. Such a configuration can eliminate the problem of lint adhering to the frozen treat and may improve image quality if printing is performed.

In a preferred embodiment, the distribution zone layer 132 may also utilize chemical and/or non-chemical treatments to seek to keep the fluid in the absorbent zone layer 134 from returning back to the distribution zone layer 132. By way of example, treatments can be added or performed to the distribution zone layer fabrics to make them slightly hydrophilic to distribute fluid to the absorbent zone, but not sufficiently hydrophilic to cause rewetting of the fluid from the absorbent zone back to the distribution zone layer 132, thereby providing a substantially one-way fluid communication from the distribution zone layer to the absorbent zone layer.

By way of further illustrative, non-limiting examples, the distribution zone layer 132 can be produced from natural fibers, such as, for example, cellulose, pulp, cotton, or synthetic fibers, such as, for example, polyester, polyamide, polypropylene, polyethylene, acrylic or RAYON, in a paper or nonwoven fabric construction. It is understood that these are merely illustrative examples and other materials may be used.

Paper and non-woven fabrics can also vary substantially by variations in the methods used to form the web and the bonding of the web into a fabric. The fabrics of the distribution zone layer 132 can be dry laid, wet laid, air laid, spunbonded, meltblown, carded, garneted, crosslapped, inclined fourdrinier, cylinder formed, extruded, cast film, coformed and flash-spun or produced by other methods suitable for producing webs or fabrics. These processes can optionally be combined and the fibers can be blended to produce a suitable material for the distribution zone layer 132. Bonding variation examples can include, but are not limited to, mechanically bonded, stitchbonded, neddlefelted, needlepunched, spunlaced, jetlaced, hydroentangled, apertured, chemically bonded, resin bonded, latex bonded, powder bonded, print bonded, saturated, spray bonded, foam bonded, frothed, thermal bonded, point bonded and ultrasonically welded.

The distribution zone layer 132 may also provide stiffness to the multi-zone napkin 130. Providing sufficient stiffness to maintain a substantially planar napkin can also minimize spilling of the fluid contacting the top surface of the distribution zone layer, as the fluid may be more likely to enter the distribution zone layer 132, instead of rolling off of the top surface due to an excessive angle from horizontal of the top surface. In one example, a distribution zone layer 132 that is highly bonded and thick enough to provide the necessary stiffness could be used.

The absorbent zone layer 135 of the multi-zone napkin 130 is in fluid communication with the distribution zone layer 132 to receive fluid from the distribution zone layer 132. The absorbent zone layer 135 holds fluid from the distribution zone layer 132. The fluid holding capacity of the absorbent zone layer can be designed for various amounts. These amounts may be determined by the target food product weight and an estimate of the holding capacity necessary for acceptable performance.

Although the invention is not so limited, the absorbent zone layer 135 may optionally be produced from the same or different fibers, processes and/or treatments as the distribution zone layer 132, and may often be thicker than the distribution zone layer 132 as needed to provide volume to hold the desired amount of fluid. The absorbent zone layer 135 is formed of a natural and/or synthetic absorbent material. Examples of which include, but are not limited to, wood pulp, other cellulose or natural hydrophilic fibers, Super Absorbent Polymer (SAP), or a combination of these materials. The absorbent zone layer 135 may optionally be a nonwoven fabric produced from absorbent fibers, or a nonwoven fabric produced from hydrophobic fibers with absorbent materials distributed with the fabric structure. The absorbent zone layer 135 could also optionally be a wood pulp core layer that is neither a paper nor a nonwoven fabric. This core could have SAPs entrained to enhance fluid capacity. In an illustrative case an absorbent zone layer 135 is formed of one or more layers of a fiber blend.

SAPs can be in powder and/or fiber form and can optionally be used as part of a non-woven fabric, such as a fabric having an air laid web formation. Examples of manufacturers of SAPs include ATOFINA of Philadelphia, Pa. and LYSAC Technologies, Inc. of Boucherville, Quebec, Canada. LYSAC Technologies also provides Safe and Natural Absorbent Polymers (SNAPs) using processed starch, instead of petroleum-based additives that may be found in other SAPs. SORB-FRESH is an example of a SNAP employed as a meat packaging product.

The absorbent zone layer 135 layer may also provide stiffness to the fabric to minimize or prevent drooping of the multi-zone napkin 130. In a preferred embodiment, stiffness may be maintained as the fluid level in the absorbent zone layer is substantially saturated.

Figure 4:
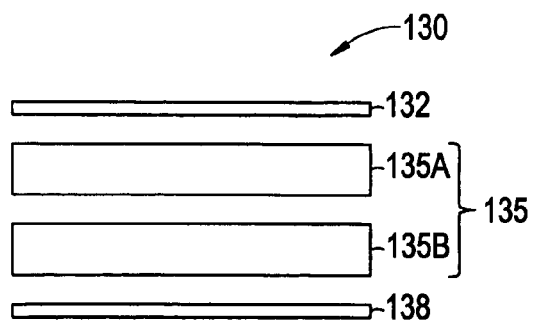
FIG. 4 is an exploded side view of a multi-zone napkin according to an embodiment of the invention.

It is understood that either or both of the distribution zone layer 132 or absorbent zone layer 135 may be formed of two or more layers to provide the desired fluid holding capacity and/or stiffness. As shown by way of example in FIG. 4, an example is shown in which the absorbent zone layer 135 is formed of a first layer 135A and a second layer 135B, located between the distribution zone layer 132 and the barrier zone layer 138.

In another embodiment, the distribution and absorbent layers 132, 135 may be formed from one material. In this embodiment, the distribution zone layer is the smooth top surface of a nonwoven fabric that is an absorbent fabric and the absorbent portion of the fabric forms the absorbent zone layer 135. The smooth top surface could be the result of the forming or bonding method, such as, for example, a lofty through-air bonded material, or of a secondary thermal, glazing or calendering process that smoothes the top surface.

The barrier zone layer 138 is located adjacent to the absorbent zone layer 135 and is on an opposite side of the absorbent zone layer 135 from the distribution zone layer 132. The barrier zone layer 138 is a water resistant and/or water proof layer that minimizes or prevents the penetration of liquid through the multi-zone napkin 130. It is understood that the barrier zone layer 138 may also be formed of more than one layer. In an illustrative embodiment, the water-resistant or water-proof properties of the barrier zone layer 138 attempt to prevent liquid in the absorbent zone layer 135 from reaching a user's hand that is holding the support 110 proximate to the barrier zone layer 138.

A variety of materials may be used to form the barrier zone layer. Examples include, but are not limited to, plastics, such as polyester, polypropylene and polyethylene, wax paper or other forms of paper impregnated with a hydrophobic material. In one example a 1 mm thick plastic film is used. It is understood that the barrier zone layer 138 may be water resistant or water proof. In another example a polymer film, such as, for example, polyethylene film can be used or a coating can be applied to the bottom of the absorbent zone layer to seal the absorbent zone layer and forming a barrier zone layer.

Optionally, the barrier zone layer 138 may provide the desired stiffness to the multi-zone napkin 130 in addition to or in place of any stiffness provided by the distribution zone layer 132 or absorbent zone layer 135. Such stiffness may be provided by a barrier zone layer 138 of, for example, plastic of sufficient thickness.

In another example of an implementation of the invention, both the distribution zone layer 132 and the barrier zone layer 138 may be formed by applying a coating to the absorbent zone layer 135. The coating would smooth the surface while allowing good distribution properties and the bottom coating would seal the absorbent zone layer bottom providing barrier properties.

In another example, a single material may be treated thermally and with calendering on a top and/or bottom surface to produce both a top surface forming the distribution zone layer and a bottom surface forming the barrier zone layer, with a center portion forming the absorbent zone layer. In such a case, the fibers of the material could react to the heat and calendering process by thinning out and flowing to form a film-like surface. Thermoplastic fibers would be one example of such a fiber. Pores would remain open enough on the distribution zone layer to allow liquid to pass. The distribution zone layer could also be smooth enough to enable printing thereon. A surfactant added to the fibers or fabric could also be used to enhance hydrophilicity characteristics to enhance the strikethrough performance. In the example, calendering of the top surface is done to a lesser extent than calendering of the bottom surface. Calendering of the bottom surface of the fabric can form a barrier zone layer by closing at least substantially all the pores along the surface to form a barrier zone layer.

Figure 5:
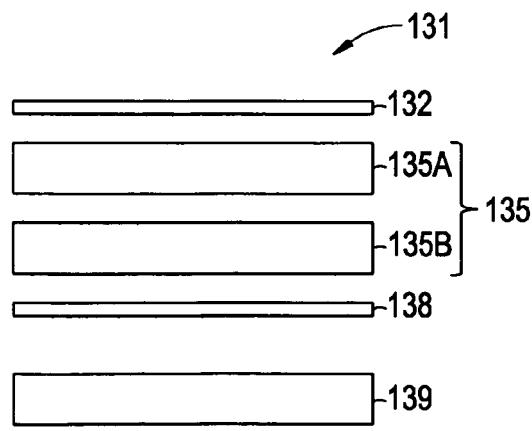
FIG. 5 is an exploded side view of a multi-zone napkin having a fourth layer according to an embodiment of the invention.

Optionally, as shown in FIG. 5, a multi-zone napkin 130' may include a fourth layer 139 to enhance the feel of the multi-zone napkin against the user's hand over the feel of some water resistant materials that could be used in the barrier zone layer 138. For example, a non-woven layer 139 could be added so that the layer positioned closest to a user's hand holding the support 110 is a soft layer. Optionally, more than one layer may form the fourth layer 139. For example, a layer of puff pulp 139 may be provided next to the barrier zone layer to provide additional cushion, with a non-woven layer positioned closest to a user's hand to retain the puff pulp. In addition to enhancing the feel of the multi-zone napkin 130 against a user's hand, the fourth layer 139 may also provide additional thermal insulation between the user's hand and the frozen treat.

In manufacturing of the multi-zone napkin, the zone layers, and any multiple layers within a zone, of the multi-zone napkin may be located relative to each other in a variety of ways. It is understood that a variety of mounting methods for holding the zone layers of the multi-zone napkin will be apparent to one of skill in the art and that these methods are intended to be within the scope of the invention. Example of such methods include adhesives, hot melt adhesives, thermal bonding, thermal and moisture bonding, ultrasonic bonding, compression bonding, including embossing and stamping and one or more fasteners. Examples of fasteners include staples, grommets, rivets, stitching and clips. Adhesives may be chosen to be non-toxic and optionally can be used to stiffen the multi-zone napkin.

In one example, a substantial amount of adhesive is applied to the top of the barrier zone layer to enhance stiffness and minimize the amount of liquid reaching other parts of the barrier zone layer. Adhesive used between the distribution zone layer and absorbent zone layer can be minimized to reduce a barrier for liquid traveling from the distribution zone layer to the absorbent zone layer. In addition to, or in place of, adhesive located along a zone layer surface, all or a portion of the perimeter of one or more layers may also be attached to each other to minimize delamination of the device. Attachment of may be performed in a wide variety of ways, such as, for example, by heat treatment to melt the layers, embossing or crimping of the layers together and/or the use of fasteners.

The perimeter of the multi-zone napkin 130 may be sealed to help prevent fluid from leaking out the sides and inhibit separation of the layers along the edge. Non-limiting examples of edge sealing include use of a hot die when cutting the perimeter of the multi-zone napkin or embossing.

A method of assembling the multi-zone napkin include printing on the distribution zone layer, adhering the layers together and cutting the adhered layers to the desired shape. The mounting slot may be formed before, during, or after the cutting. Another method of assembly involves adhering the layers together, printing on the distribution zone layer and cutting the layers. A third method of assembly includes the acts of printing on the distribution zone layer, cutting the layers and adhering the layers. The mounting slot is also formed in all of the layers.

Another method involves manufacturing a multi-zone napkin for use with a frozen treat. The method includes the acts of printing an image on a distribution zone layer and adhering an absorbent zone layer to both the distribution zone layer and a barrier zone layer. A continuous mounting slot is also cut in each of the absorbent zone layer, the distribution zone layer and the barrier zone layer. Another such method includes calendering a top surface of a fabric with heat to leave open pores to form a distribution zone layer. A portion of the fabric below the top surface forms an absorbent zone layer. A barrier zone layer is adhered to the absorbent zone layer. A continuous mounting slot is cut in each of the distribution zone layer, the absorbent zone layer, and the barrier zone layer. A further method of manufacturing a multi-zone napkin for use with a frozen treat differs in that instead of adhering a barrier zone layer, a bottom surface of the fabric is calendered with heat, to a greater degree than that done to the top surface, to close substantially all pores to form a barrier zone layer.

Figure 6:
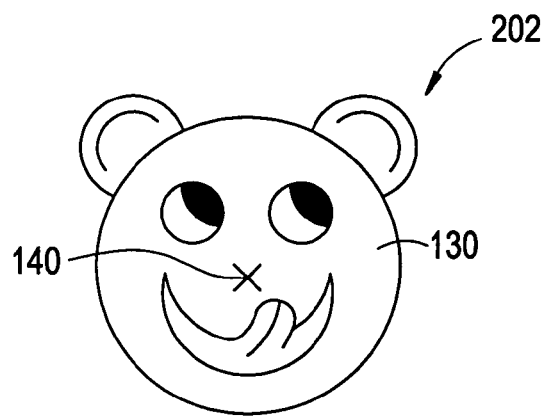
FIGS. 6-9 illustrate various examples of shapes of multi-zone napkins according to implementations of the invention.
Figure 7:
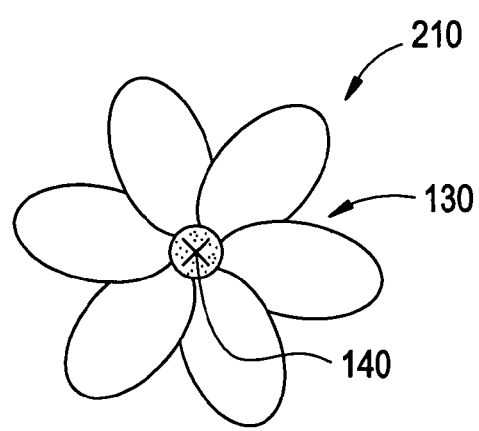

The shape of the perimeter of a multi-zone napkin may be round, square or a wide variety of other shapes. In some examples of the invention a perimeter is in the shape of an image formed by the ink on the distribution zone layer. Non-limiting examples of this are in FIG. 6, showing a bear head have a perimeter representing the shape of the bear head and ears, and FIG. 7, with a perimeter corresponding to the shape of a flower. The devices 202, 210 of FIGS. 6 and 7 are multi-zone napkins 130 with mounting slots 140. The invention may include a wide variety of other perimeter shapes corresponding to artwork printed on the multi-zone napkin.

Figure 8:
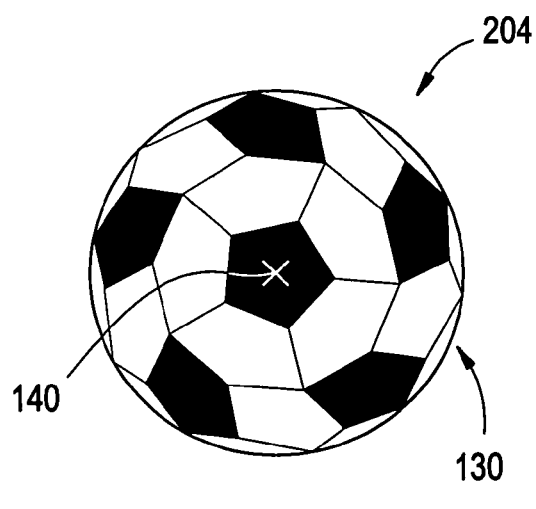
Figure 9:
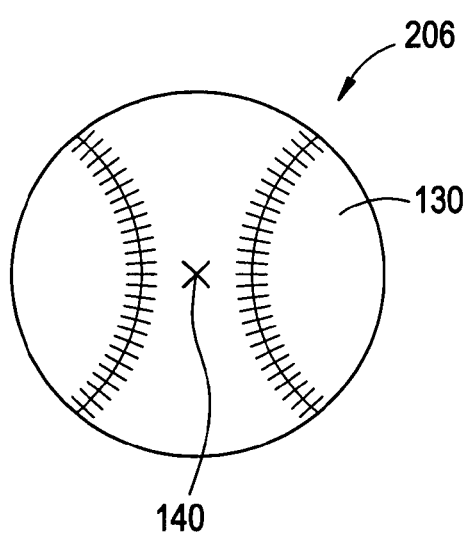

FIGS. 8 and 9 show examples illustrating a set shape, such as a circle, used with a graphic, such as the soccer ball and baseball, which are merely illustrative examples. The devices 204, 206 of FIGS. 8 and 9 are multi-zone napkins 130 with mounting slots 140. Other shape examples include the two-dimensional shape of a body, head and shoulders or a head of a person, cartoon character, movie character, an animal, a vehicle, machine, smiley face, swirl or a sun.

The shape of the multi-zone napkin may be formed in a wide variety of ways, such as by cutting both with or without heat, such as stamping, die cutting, hot die cutting, knife cutting, laser cutting, or the use of shears. In the event that an image in printed on the distribution zone layer, optical viewing/alignment of the cutting mechanism to the distribution zone layer may be desirable.

The mounting slot 140 is provided in each of the layers so as to form a hole in the multi-zone napkin 130 to accommodate the support 110 for the frozen treat 120. The mounting slot may be provided in the form of a hole, a cross, a plus, or an X, or may simply be a single slit. The hole may, for example, be rectangular or circular. One example is a ¼ inch diameter circular hole. The mounting slot 140 may be sized to inhibit sliding of the multi-zone napkin 130 along the support 110, although the invention is not so limited. In the event the mounting slot 140 is initially formed as a perforation, the support 110 can be used to break the perforation and form a hole sufficient to accommodate the support 110. The mounting slot 140 may be formed in a wide variety of ways, such as by cutting, such as die cutting, laser cutting, punching, or the use of shears. In one implementation, the mounting slot 140 is formed by the use of a ¼ inch circle punch. In another implementation, a rectangular punch is used to form a hole sized to form a snug fit on a rectangular cross-section, wood stick support 110. The mounting slot may be formed before, during, or after the cutting of the perimeter of the layers. For example, a die cutting process may simultaneously cut both the perimeter of the napkin and the mounting slot.

The stiffness and contour of the multi-zone napkin may be determined by the properties of the layers used. Optionally, the stiffness may also be modified by the use of chemical additives. For example, polyurethane may be added to the distribution or absorbent zone layers to increase the stiffness of the layer. Also, adhesives such as a hot-melt adhesive may be used to increase stiffness. Although the multi-zone napkin is typically substantially planar, implementations of the invention may also be non-planar, such as by upturning the edges of the multi-zone napkin to aid in retaining drips. Other variations include providing surface variations to emphasize various features of a graphical image located on the distribution zone layer. For example, outlines of the eyes and mouth could be provided, such as by stamping or embossing the perimeters of these items, to emphasize these aspects of a graphical design and provide a more three-dimensional appearance.

It is understood that the multi-zone napkin may be provided with or without a support 110 and frozen treat 120. The multi-zone napkin may be provided with the support 110 located through the mounting slot 140, or the consumer may position the support 110 through the mounting slot 140.

According to another embodiment of the invention, a method provides for capturing liquid dripping from a frozen treat. The method includes providing a multi-zone napkin having a distribution zone layer, an adjacent absorbent zone layer in fluid communication with the distribution zone layer, and a barrier zone layer located adjacent to the absorbent zone layer. A support having a frozen treat is located through a mounting slot formed in the distribution zone layer, the absorbent zone layer and the barrier zone layer. A drip from the frozen treat is received in the distribution zone layer. At least a portion of the drip is distributed through the distribution zone layer into the absorbent zone layer.

Various trials were performed to explore how various samples performed. The samples are listed in Table 1.

TABLE 1

| Sample # | Function | Vendor | Basis Weight | Fiber Content | Process | Absorbency | Thickness |
|---|---|---|---|---|---|---|---|
| 132951 | Distrib. | Ahlstrom | 65 gsm | polyester/cellulose | Hydroentangled | | 11 mil** |
| 118377 | Distrib. | Ft. James | 57 gsm* | | Airlaid | | 12 mil** |
| 118312 | Distrib. | | 1.6 osy | Cellulose | Airlaid | | 14 mil** |
| Dexter 7887 | Distrib. | Ahlstrom | 59 gsm | 100% pulp | Wet Laid | 300% | 9 mil** |
| 10180 | Distrib. | Ahlstrom | 55 gsm | Cellulose/synthetic blend | Hydroentangled | 735% | 650 microns, 16 mil** |
| 9655 | Distrib. | Ahlstrom | 45 gsm | | Wet Laid | | 125 microns, 6 mil** |
| 1383 | Distrib. | Ahlstrom | 49 gsm* | | Wet Laid | | 6 mil** |
| 4252 | Distrib. | Ahlstrom | 54 gsm | Cellulose/synthetic blend | Wet Laid | 450% | 293 microns, 20 mil** |
| 3921 | Absorp. | Buckeye | 165 gsm | Pulp/Bicomponent Fiber blend w/SAP | Airlaid | 13 g/g | 2.07 mm, 47 mil** |
| 3011 | Absorp. | Buckeye | 130 gsm | Pulp/Bicomponent Fiber blend | Airlaid | 16 g/g | 3.38 mm, 63 mil** |
| KC-Pad | Absorp. | Kimberly-Clark | 285 gsm* | | Laminate | | 83 mil** |
| Drisite | Absorp. | Shawmut | 72 gsm* | | Wet Laid/film | | 20 mil** |
| X902 | Absorp. | Buckeye | 150 gsm | Pulp/Bicomponent Fiber blend | Airlaid | 12 g/g | 56 mil** |
| Ultra Thin Nursing Pad | Absorp./Barrier | Gerber | | | Nonwoven/fluff Laminate | | 76 mil** |
| Polyester | Barrier | DuPont or Toray | | Polyester film | Extrusion-Biax | | 2 mil |
| Polypropylene | Barrier | Toray | | PP Film | Extrusion-Biax | | 2 mil |
| Polyethylene | Barrier | | | PE Film | | | |
| TX 1540 | Barrier | | | PE/Polyurethane | Extrusion | | |

*sample measured and weighed
**uncompressed sample thickness measured

The Vendors listed in Table 1 are as follows: Ahlstrom Windsor Locks LLC, Windsor Locks, Conn.; Buckeye Absorbent Products, Memphis, Tenn.; Georgia Pacific Corp, Atlanta, Ga. on Nov. 27, 2000 announced acquisition of Fort James company; Kimberly-Clark Corporation, World Headquarters, Dallas, Tex.; Shawmut Advanced Materials, West Bridgewater, Mass.; Gerber Products, Freemont Mich.; DuPont Global Headquarters, Wilmington, Del.; and Toray, North Kingstown, R.I.

Test #1

Samples were prepared to evaluate for performance in an actual ice pop drip test. Swatches of fabrics were cut into squares, glued together using 3M Super 77 Multipurpose spray adhesive, and then were cut into circles 4 inches in diameter. Each sample was folded over and a cut made in the center to allow the ice pop handle to pass through. Each sample was numbered. Each sample was placed on a 1.1 fluid ounce ice pop and the handle of the ice pop was pushed into a foam block which supported multiple ice pops in an upright position. The foam blocks were placed outside in the sunlight, and observations were made for the performance of each sample as the ice pops were allowed to melt completely. The results are shown in Table 2.

TABLE 2

| Sample | Distrib. Zone | Absor. Zone (1) | Absor. Zone (2) | Barrier Zone | Shape Retention |
|---|---|---|---|---|---|
| 1 | 132951 | 3011 | n/a | n/a | ++ |
| 2 | 132951 | 3011 | n/a | film | ++ |
| 3 | 132951 | KC pad | n/a | film | ++ |
| 4 | 132951 | Drisite | n/a | film | + |
| 5 | 132951 | 3921 | n/a | film | +++ |
| 6 | 132951 | X902 | n/a | film | ++++ |
| 7 | 118377 | 3011 | n/a | film | ++ |
| 8 | 118312 | 3011 | n/a | film | ++ |
| 9 | 7887 | 3011 | n/a | film | ++ |
| 10 | 10180 | 3011 | n/a | film | ++ |
| 11 | n/a | 3921 | n/a | film | +++ |
| 12 | n/a | KC pad | n/a | film | + |
| 13 | n/a | Drisite | n/a | film | + |

Test #2

Additional samples was prepared. The steps of Test #1 above were performed, except that the foam mounting configuration was changed in this test to more closely represent a hand holding the ice pop stick by providing an egg-shaped piece of foam on the stick below the napkin and above the foam base. Individual circular foam bases were used instead of a foam block supporting multiple ice pop sticks The results are provided in Table 3.

at once onto the sample from approximately the highest point on the sample to see if the water ran off or absorbed/distributed. The sample was considered very good if the water was absorbed into the sample with none running off. The results are provided in Table 4

TABLE 4

| Sample | First Layer | Result |
|---|---|---|
| 1 | 132951 | + |
| 2 | 118377 | ++ |
| 3 | 118312 | ++++ |
| 4 | 10180 | +++ |
| 5 | 7887 | + |
| 6 | 4252 | ++ |

In some cases the first layers are reported to have some absorbency, but the light weight and/or thickness of these fabrics reduces their contribution to the total capacity, and the preferred top distribution zone layer passes almost all of the fluid through to the absorbent zone layer.

The present invention may be used with a wide variety of frozen treats. Examples of frozen treats can include frozen liquid treat, ice cream treats and flavored ice pops and other frozen products adapted to be mounted on a support, such as a stick.

The present invention has been described by way of example, and modifications and variations of the exemplary embodiments will suggest themselves to skilled artisans in this field without departing from the spirit of the invention. Features and characteristics of the above-described embodiments may be used in combination. The preferred embodiments, tests and lists of example materials and processes provided herein are merely illustrative and should not be considered restrictive in any way. The scope of the invention is to be measured by the appended claims, rather than the preceding description, and all variations and equivalents that fall within the range of the claims are intended to be embraced therein.

TABLE 3

| Sample | Distrib. Zone | Absor. Zone (1) | Absor. Zone (2) | Barrier Zone | Combined Look/Feel | Shape Retention | Distribution Zone Performance | Absorption Zone Performance | Overall Fluid Management |
|---|---|---|---|---|---|---|---|---|---|
| 1 | 132951 | 10180 | X902 | film | ++++ | +++ | + | n/a | + |
| 2 | 132951 | 10180 | X902 | n/a | +++ | +++ | + | n/a | + |
| 3 | 10180 | X902 | n/a | film | +++ | +++ | ++++ | ++ | ++ |
| 4 | 118312 | X902 | n/a | film | +++ | +++ | ++++ | +++ | +++ |
| 5 | 118312 | 10180 | X902 | film | +++ | +++ | ++++ | +++ | +++ |
| 6 | n/a | Ultra Thin Nursing Pad | n/a | Ultra Thin Nursing Pad | ++ | + | + | + | + |
| 7 | 118312 | 3011 | X902 | film | +++ | ++++ | ++++ | ++++ | ++++ |
| 8 | 118312 | 3011 | 3921 | film | +++ | ++++ | ++++ | ++++ | ++++ |
| 9 | 4252 | X902 | n/a | film | +++ | +++ | + | ++ | ++ |
| 10 | 4252 | 3011 | x902 | film | +++ | +++ | + | n/a | ++ |
| 11 | 10180 | 3011 | x902 | film | +++ | ++++ | +++ | +++ | +++ |

Test #3

This test was designed to screen distribution zone layers by testing for run-off. The first layer samples were cut into 4 inch squares and laid on top of squares of sample 3011 without using adhesive. The samples were laid on the edge of a bowl resulting in the sample being tilted at approximately 45 degrees. A dropper filled with 12 cc of water was emptied all

What is claimed is:
1. A device for use with a frozen treat, comprising:
a distribution zone layer having a top surface;
an absorbent zone layer, located adjacent to the distribution zone layer opposite the top surface of the distribution zone layer and in fluid communication with the distribution zone layer;

print located on the top surface of the distribution zone layer, the distribution zone layer having a perimeter formed by the print and the distribution zone layer allowing for the display of the print without substantial distortion due to absorbency of the print into the distribution zone layer while maintaining a fluid distribution property to the absorbent layer;

a barrier zone layer located adjacent to the absorbent zone layer opposite the distribution zone layer;

a mounting slot, formed in the distribution zone layer, the absorbent zone layer and the barrier zone layer, adapted to receive a stick upon which the frozen treat is mounted, the device having sufficient stiffness to maintain a substantially planar shape during use; and wherein the distribution zone layer, the absorbent zone layer, and the barrier zone layer are exposed around the perimeter of the device.

2. The device of claim 1, wherein the distribution zone layer comprises cellulose.

3. The device of claim 1, further comprising a chemical located in the top surface of the distribution zone layer to enhance hydrophilic properties of the top surface of the distribution zone layer.

4. The device of claim 1, wherein the distribution zone layer comprises cellulose and the absorbent zone layer comprises a fiber blend.

5. The device of claim 4, wherein the absorbent zone layer comprises two layers, each of the two layers being a fiber blend, the two layers secured to each other by an adhesive.

6. The device of claim 4, wherein the barrier zone layer is polyethylene.

7. The device of claim 1, wherein the distribution zone layer comprises synthetic fibers and the absorbent zone layer comprises natural fibers.

8. The device of claim 1, wherein the distribution zone layer and absorbent zone layer are formed from a single fabric.

9. The device of claim 1, wherein the distribution zone layer, absorbent zone layer and barrier zone layer are formed from a single fabric.

10. The device of claim 1, further comprising a fourth layer formed of a soft material located on the barrier zone layer opposite the absorbent zone layer.

11. The device of claim 1, wherein the fluid communication between the absorbent zone layer and the distribution zone layer is substantially a one-way communication from the distribution zone layer to the absorbent zone layer.

12. The device of claim 1, further comprising a chemical located in at least a part of the distribution zone to inhibit fluid travel from the absorbent zone layer to the distribution zone layer.

13. The device of claim 1, wherein the mounting slot is a single slit.

14. The device of claim 1, wherein the print comprises ink.

15. The device of claim 1, wherein the distribution zone layer, the absorbent zone layer and the barrier zone layer have a perimeter in the shape of an image formed by the print.

16. The device of claim 1, wherein the barrier zone layer is waterproof.

17. The device of claim 1, wherein the distribution zone layer, the absorbent zone layer and the barrier zone layer are substantially planar when the stick is located in the mounting slot.

18. The device of claim 1, wherein the device remains substantially planar when the absorbent zone layer is substantially saturated.

19. The device of claim 1, wherein at least two of the group of the distribution zone layer, the absorbent zone layer and the barrier zone layer are attached at least along a portion of perimeter.

20. The device of claim 1, wherein the device, when positioned at approximately 45 degrees from vertical, retains 12 cc of water deposited at one time on the distribution zone layer with none of the water running off of the device.

21. A device for use with a frozen treat, comprising:

a first layer of hydrophilic, fluid pass-through material having a top surface and a bottom surface;

a second layer of absorbent material, having a top surface located on the bottom surface of the first layer to receive fluid from the first layer;

print located on the top surface of the first layer, the first layer having a perimeter formed by the print and the first layer allowing for the display of the print without substantial distortion due to absorbency of the print into the first layer while maintaining a fluid distribution property to the second layer;

a third layer of water-resistant material, the third layer located on a bottom surface of the second layer;

a mounting slot, formed in the first layer, the second layer, and the third layer, adapted to receive a stick upon which the frozen treat is mounted, the device being sufficiently stiff to maintain a substantially planar shape during use; and wherein the first layer, the second layer, and the third layer are exposed around the perimeter of the device.

22. The device of claim 21, wherein the first layer is formed of cellulose and the second layer is formed of two layers, each of the two layers being a fiber blend.

23. The device of claim 21, wherein the device, when positioned at approximately 45 degrees from vertical, retains 12 cc of water deposited at one time on the first layer with none of the water running off of the device.

24. The device of claim 21, wherein the print comprises ink.

25. The device of claim 21, wherein the first layer, the second layer and the third layer have a perimeter in the shape of an image formed by the print.

26. A system for holding a frozen treat, comprising:

a distribution zone layer having a top surface;

an absorbent zone layer, located adjacent to the distribution zone layer opposite the top surface of the distribution zone layer and in fluid communication with the distribution zone layer;

print located on the top surface of the distribution zone layer, the distribution zone layer having a perimeter formed by the print and the distribution zone layer allowing for the display of the print without substantial distortion due to absorbency of the print into the distribution zone layer while maintaining a fluid distribution property to the absorbent layer;

a barrier zone layer located adjacent to the absorbent zone layer opposite the distribution zone layer;

a mounting slot, formed in the distribution zone layer, the absorbent zone layer and the barrier zone layer, adapted to receive a stick upon which the frozen treat is mounted;

a support upon which the frozen treat can be mounted, the support extending through the mounting slot, the device being sufficiently stiff to maintain a substantially planar shape during use; and wherein the distribution zone layer, the absorbent zone layer, and the barrier zone layer are exposed around the perimeter of the system.

27. The system of claim 26, wherein the print comprises ink.

28. The device of claim 26, wherein the distribution zone layer, the absorbent zone layer and the barrier zone layer have a perimeter in the shape of an image formed by the print.

29. The device of claim 26, wherein the combination of the distribution zone layer and absorbent zone layer, when positioned at approximately 45 degrees from vertical, retain 12 cc of water deposited at one time on the distribution zone layer with none of the water running off of the distribution zone layer.

30. The system of claim 26, further comprising the frozen treat mounted on the support and proximate to the distribution zone layer.

31. The device of claim 1, wherein the sufficient stiffness is provided by at least one of the distribution zone, the absorbent zone, and the barrier zone.

32. The device of claim 21, wherein the sufficient stiffness is provided by at least one of: the first layer of hydrophilic, fluid pass-through material; the second layer of absorbent material; and the third layer of water-resistant material.

33. The device of claim 26, wherein the sufficient stiffness is provided by at least one of the distribution zone layer, the absorbent zone layer, and the barrier zone layer.

34. The device of claim 5, wherein the sufficient stiffness is provided by the adhesive.

* * * * *